United States Patent
Yamaoka et al.

(10) Patent No.: US 10,558,846 B2
(45) Date of Patent: Feb. 11, 2020

(54) FACE COLLATION DEVICE, FACE COLLATION SYSTEM COMPRISING SAME, AND FACE COLLATION METHOD

(71) Applicant: PANASONIC INTELLECTUAL PROPERTY MANAGEMENT CO., LTD., Osaka (JP)

(72) Inventors: Megumi Yamaoka, Tokyo (JP); Kaori Mori, Kanagawa (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 150 days.

(21) Appl. No.: 15/527,160

(22) PCT Filed: Jul. 4, 2016

(86) PCT No.: PCT/JP2016/003174
§ 371 (c)(1),
(2) Date: May 16, 2017

(87) PCT Pub. No.: WO2017/017900
PCT Pub. Date: Feb. 2, 2017

(65) Prior Publication Data
US 2017/0357845 A1  Dec. 14, 2017

(30) Foreign Application Priority Data
Jul. 27, 2015 (JP) .................. 2015-147534

(51) Int. Cl.
*G06K 9/00* (2006.01)
*G06F 16/50* (2019.01)
*G06K 9/62* (2006.01)

(52) U.S. Cl.
CPC ......... *G06K 9/00221* (2013.01); *G06F 16/50* (2019.01); *G06K 9/00295* (2013.01);
(Continued)

(58) Field of Classification Search
CPC .......... G06F 17/30244; G06K 9/00221; G06K 9/00295; G06K 9/00926; G06K 9/6253; G06T 7/00; G06T 2207/30201
See application file for complete search history.

(56) References Cited

U.S. PATENT DOCUMENTS

2004/0177324 A1* 9/2004 Simmons .............. G06F 17/211
715/255
2007/0253603 A1* 11/2007 Kimura .............. G06K 9/00255
382/115

(Continued)

FOREIGN PATENT DOCUMENTS

JP  2007249371 A  *  9/2007
JP  2008-257487  10/2008

(Continued)

OTHER PUBLICATIONS

Search Report and Written Opinion issued in International WIPO Patent Application No. PCT/JP2016/003174, dated Sep. 13, 2016.

*Primary Examiner* — Mekonen T Bekele
(74) *Attorney, Agent, or Firm* — Greenblum & Bernstein, P.L.C.

(57) ABSTRACT

To improve precision in collation processes or create a database of collation images by registering at least a part of captured images not matching a previously registered face image, as a collation face image, a face collation apparatus includes an image acquirer that acquires captured face images captured by a capturing device, a registered-person image storage that stores registered-person images that are previously registered face images, an image collator that collates the captured images with the registered-person images, an unregistered-person image storage that stores the captured images that do not match the registered-person images, an image output that outputs at least one of the unregistered-person images stored in the unregistered-per- (Continued)

son image storage to a display device, and an image register, selected to be registered by a user, that registers the unregistered-person image, among the unregistered-person images output to the display device, as a registered-person image in the registered-person image storage.

18 Claims, 8 Drawing Sheets

(52) U.S. Cl.
CPC ....... *G06K 9/00926* (2013.01); *G06K 9/6253* (2013.01); *G06T 2207/30201* (2013.01)

(56) References Cited

U.S. PATENT DOCUMENTS

| | | | | |
|---|---|---|---|---|
| 2008/0118156 A1* | 5/2008 | Okada | ................ | G06K 9/00228 382/195 |
| 2009/0009652 A1* | 1/2009 | Sudo | ................ | H04N 5/23293 348/349 |
| 2009/0208108 A1* | 8/2009 | Shimano | ............. | G06K 9/4661 382/190 |
| 2009/0226029 A1* | 9/2009 | Shimano | ................ | G06T 5/009 382/100 |
| 2011/0058028 A1* | 3/2011 | Sakai | ................ | G06K 9/00288 348/77 |
| 2011/0087677 A1* | 4/2011 | Yoshio | ............. | G08B 13/19613 707/749 |
| 2011/0158536 A1* | 6/2011 | Nakano | ............. | G06K 9/00281 382/190 |
| 2014/0010419 A1* | 1/2014 | Irie | ...................... | G06K 9/6272 382/118 |
| 2014/0362215 A1* | 12/2014 | Yoshio | ............... | H04N 5/23212 348/143 |
| 2015/0086110 A1* | 3/2015 | Nishimura | ......... | G06K 9/00275 382/155 |
| 2015/0169082 A1* | 6/2015 | Li | ........................ | G06F 3/0304 345/157 |

FOREIGN PATENT DOCUMENTS

| | | |
|---|---|---|
| JP | 2011-138387 | 7/2011 |
| JP | 2012-123676 | 6/2012 |
| JP | 2012123676 A * | 6/2012 |

* cited by examiner

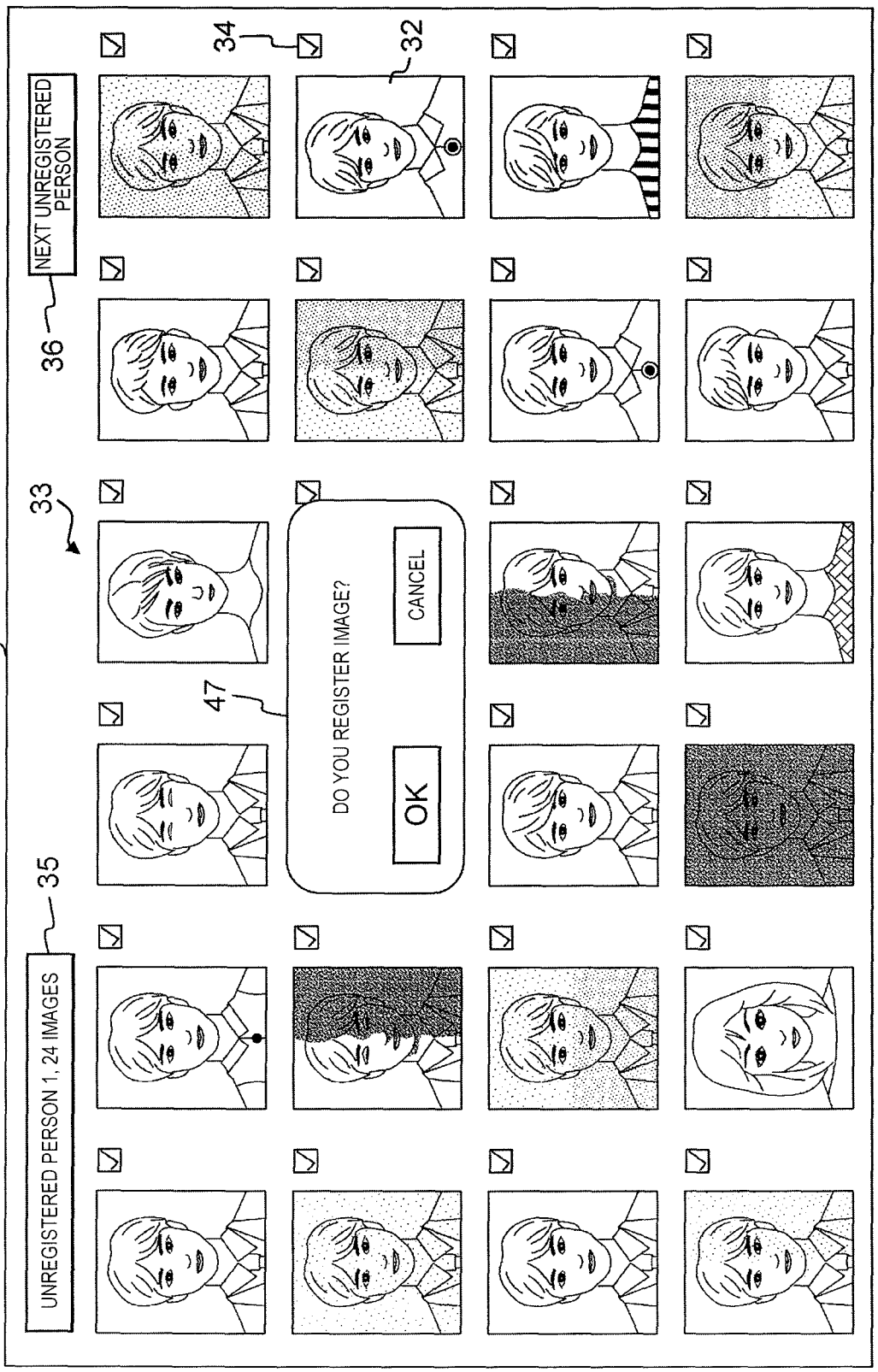

FACE COLLATION DEVICE, FACE COLLATION SYSTEM COMPRISING SAME, AND FACE COLLATION METHOD

TECHNICAL FIELD

The present disclosure relates to a face collation apparatus which collates a face image of a collated person captured by a capturing device with a face image of a previously registered person, a face collation system including the same, and a face collation method.

BACKGROUND ART

In the related art, a face collation apparatus that collates a face of a person in order to verify the person has been known. Such a type of face collation apparatus verifies a person by causing a capturing device to capture a face image of a collated person and collating the captured face image with a face image of a previously registered person. Such a face collation apparatus may be used for a security system or a monitoring camera system for security, crime prevention, guard, shoplifting prevention, or customer recognition (for example, see PTL 1).

CITATION LIST

Patent Literature

PTL 1: Japanese Patent Unexamined Publication No. 2008-257487

SUMMARY OF THE INVENTION

However, in the related art, in a case where a face image (hereinafter, referred to as a "captured image") of a collated person captured by a capturing device does not match a face image (hereinafter, referred to as a "registered-person image") of a previously registered person, the captured image is not able to be used in the subsequent collation processes. Even though the person of the captured image is the same as the person of the registered-person image, the captured image may not match the registered-person image in the collation due to a facial direction of the collated person, a light direction, or an illumination environment. If at least a part of the captured images that does not match the registered-person image in the collation can be added to the registered-person image registered in advance, it is possible to improve collation precision in the subsequent collation processes. If at least a part of the captured images that does not match the registered-person image in the collation can be newly registered as a collation face image, it is possible to generate a database of collation images.

The present disclosure has been made in view of such problems in the related arts, and it is an object of the present disclosure to provide a face collation apparatus, a face collation system including the same, and a face collation method capable of improving collation precision in the subsequent collation processes or creating a database of collation images by registering at least a part of captured images that does not match a registered-person image, as a collation face image.

According to the present disclosure, there is provided a face collation apparatus that collates face images of collated persons captured by a capturing device with face images of previously registered persons. The apparatus includes: an image acquirer that acquires the face images of the collated persons captured by the capturing device; a registered-person image storage that stores the face images of the previously registered persons; an image collator that collates the face images of the collated persons with the face images of the registered persons; an unregistered-person image storage that stores the face images of the collated persons that do not match the face images of the registered persons, as unregistered-person images; an image output unit that outputs at least one of the unregistered-person images stored in the unregistered-person image storage to a display device: and an image register that registers the unregistered-person image, which is selected to be registered by a user, among the unregistered-person images output to the display device, as a collation face image, in the registered-person image storage.

According to the present disclosure, it is possible to improve collation precision in the subsequent collation processes or create a database of collation images by registering at least a part of captured images that does not match a registered-person image, as a collation face image.

BRIEF DESCRIPTION OF DRAWINGS

FIG. 9 is a diagram showing a state in which a message box for allowing the user to check the registration is displayed on the display screen.

DESCRIPTION OF EMBODIMENT

Figure 1:
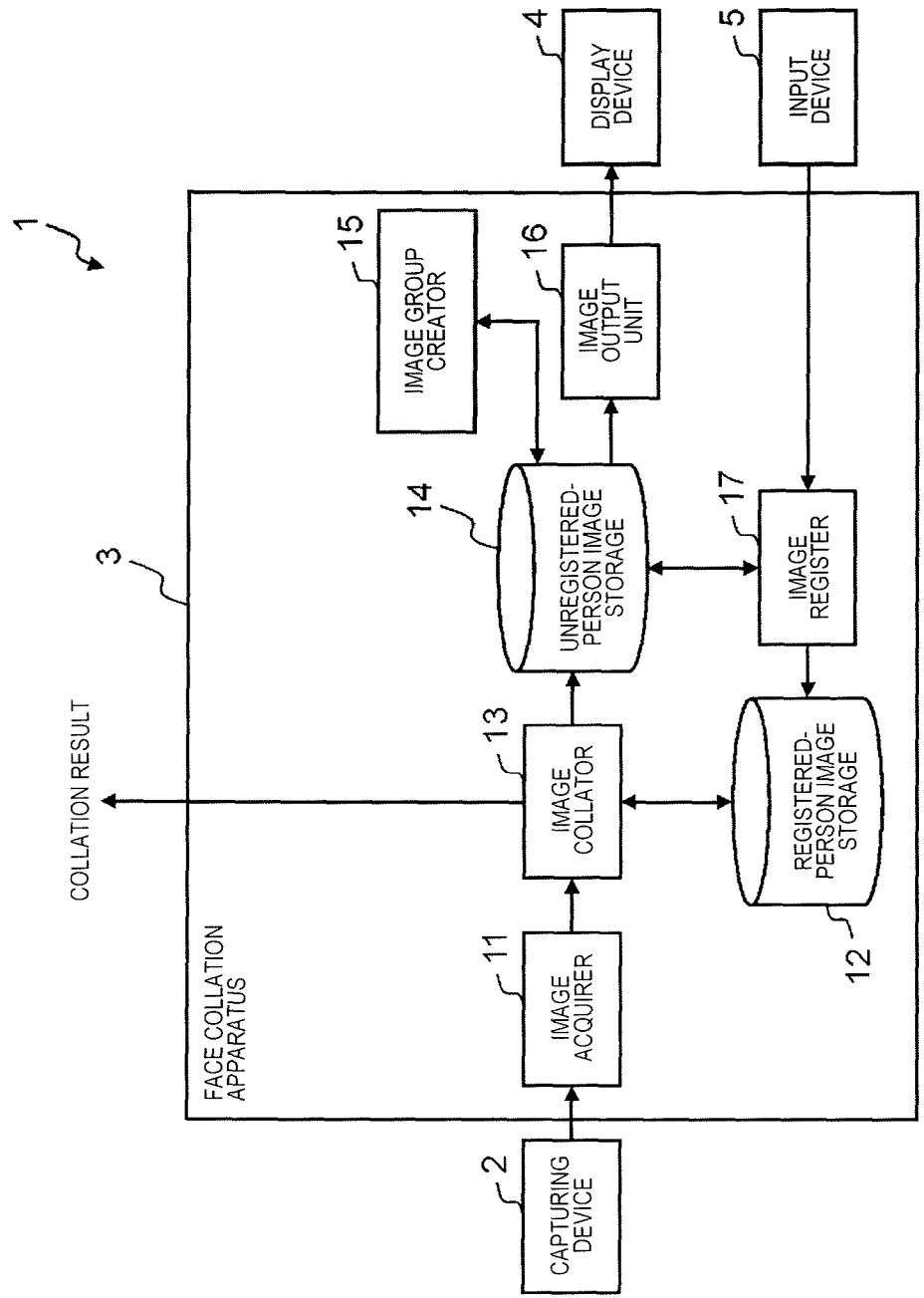
FIG. 1 is a schematic configuration diagram showing a face collation apparatus system of the present disclosure.

A first disclosure has been made in order to solve the above-described problems, and is to provide a face collation apparatus that collates face images of collated persons captured by a capturing device with face images of previously registered persons. The apparatus is configured to: acquire the face images of the collated persons captured by the capturing device; store the face images of the previously registered persons; collate the face images of the collated persons with the face images of the registered persons; store the face images of the collated persons that do not match the face images of the registered persons, as unregistered-person images; output at least one of the unregistered-person images stored in an unregistered-person image storage to a display device: and register the unregistered-person image, which is selected to be registered by a user, among the unregistered-person images output to the display device, as a collation face image, in a registered-person image storage.

According to the face collation apparatus according the first disclosure, since the captured images that do not match the registered-person image are displayed as the unregistered-person images on the display device and the unregistered-person image, which is selected to be registered by the user, among the unregistered-person images displayed on the display device, is displayed as the registered-person image, it is possible to register at least a part of the captured images that does not match the registered-person image, as a collation face image. Accordingly, it is possible to improve collation precision in the subsequent collation processes or create a database of collation images.

In a second disclosure, the face collation apparatus is configured to register the unregistered-person image, which is selected to be registered by the user among the unregistered-person images output to the display device, as a face image of a previously registered person, or register the selected unregistered-person image as a face image of a newly registered person.

According to the face collation apparatus of the second disclosure, since the captured images that do not match the registered-person images are registered as the face image of the existing registered person previously registered in the registered-person image storage or are registered as the face image of the newly registered person, in a case where the collated person is the same person as the existing registered person, it is possible to register the captured image of the collated person as the face image of the existing registered person. Accordingly, since the number of face images of the existing registered person can be increased, it is possible to improve collation precision in the subsequent collation processes. In a case where the collated person is not the same person as the existing registered person, the captured image of the collated person is registered as the face image of the newly registered person.

In a third disclosure, the face collation apparatus is configured to group the stored unregistered-person images based on similarities between the unregistered-person images and create unregistered-person image groups, and output the unregistered-person images for each unregistered-person image group to the display device.

According to the face collation apparatus according to the third disclosure, since the unregistered-person images are grouped based on the similarities between the unregistered-person images and are output for each group to the display device, the user can check or compare the plurality of unregistered-person images that are similar to each other all at once. Accordingly, the user can easily perform the operation of selecting whether or not to register the unregistered-person image as the registered-person image.

In a fourth disclosure, the face collation apparatus is configured to output the unregistered-person image groups in descending order of the number of unregistered-person images.

According to the face collation apparatus according to the fourth disclosure, since the unregistered-person image groups are output in descending order of the number of unregistered-person images, the user can perform the operation of selecting whether or not to register the unregistered-person image as the registered-person image in sequence from the unregistered-person image group of which the number of unregistered-person images is large. Since the unregistered-person image group of which the number of unregistered-person images is large is a group including a captured image having a high possibility that the collation will fail or a captured image of a person who appears with high frequency, the unregistered-person image group of which the number of unregistered-person images is large is registered in registered-person image storage, and thus, it is possible to improve collation precision in the subsequent collation processes. The operation of registering the unregistered-person image group as the registered-person image is performed in sequence from the unregistered-person image group of which the number of unregistered-person images is large, and thus, it is possible to efficiently register the unregistered-person image.

In a fifth disclosure, the face collation apparatus is configured to output only the unregistered-person image group of which the number of unregistered-person images exceeds a predetermined number to the display device.

According to the face collation apparatus according to the fifth disclosure, since only the registered-person image group of which the number of unregistered-person images exceeds the predetermined number is output to the display device, the registered-person image group of which the number of unregistered-person images is equal to or less than the predetermined number is not output to the display device. Accordingly, since it is not necessary to register the unregistered-person image in the registered-person image group of which the number of unregistered-person images is equal to or less than the predetermined number, it is possible to efficiently register the unregistered-person image.

In a sixth disclosure, the face collation apparatus is configured to perform relearning of collation data by using the unregistered-person images registered in the registered-person image storage.

According to the face collation apparatus according to the sixth disclosure, since the image collator performs the relearning of the collation data by using the unregistered-person image newly registered in the registered-person image storage, it is possible to improve collation precision in the subsequent collation processes.

A seventh disclosure is to provide a face collation system including: the above-described face collation apparatus; a capturing device that captures face images of collated persons; a display device that displays the unregistered-person images output from the face collation apparatus; and an input device that allows a user to input a command regarding registration of the unregistered-person images to the face collation apparatus.

Hereinafter, an exemplary embodiment of the present disclosure will be described with reference to the drawings.

FIG. 1 is a schematic configuration diagram showing a face collation system of the present disclosure. The face collation system is a system that verifies a person by collating a face image (hereinafter, referred to as a "captured image") of a collated person captured by a capturing device with a face image (hereinafter, referred to as a "registered-person image") of a previously registered face image, and may be applied to a security system or a monitoring camera system. For example, in a case where face collation system 1 is applied to a security system, the face collation system is used by being combined with an entrance management device that unlocks an electric key or an automatic door. In a case where face collation system 1 is applied to a monitoring camera system, the face collation system is used by being combined with a recording device or an alarm device.

As shown in FIG. 1, face collation system 1 includes capturing device 2, face collation apparatus 3, display device 4, and input device 5. A connection form of face collation apparatus 3 with capturing device 2, display device 4, and input device 5 in which face collation apparatus 3 is connected to capturing device 2, display device 4, and input device 5 through wired or wireless communication such as a local area network (LAN) is not particularly limited. For example, the face collation apparatus may be connected thereto via a network such as the Internet, or may be connected through a communication cable by using a general-purpose interface (for example, a universal serial bus (USB) interface).

Capturing device 2 is, for example, a CCD camera. The capturing device is provided on a wall or a ceiling, and captures the face image of the collated person. The form, function, and disposition of capturing device 2 and the number of capturing devices are not particularly limited, and may be variously changed as long as the capturing device can capture at least the face image of the collated person. For example, capturing device 2 may be a known omnidirectional network camera. The face image (captured image) of the collated person captured by capturing device 2 is input to face collation apparatus 3.

Display device 4 is a general display device (monitor device), and displays an unregistered-person image output from face collation apparatus 3. The details of the unregistered-person image will be described below. Input device 5 is a general input device such as a keyboard or a mouse, and is used for allowing a user to input a command to register the unregistered-person image displayed on display device 4 to face collation apparatus 3. The forms, functions, and dispositions of display device 4 and input device 5 and the number of display devices and input devices are not particularly limited, and may be variously changed as long as the display device can display the unregistered-person image and the input device can input a registration command of the unregistered-person image.

face collation apparatus 3 is a general computer device, and the details thereof is not illustrated but includes a central processing unit (CPU) that generally performs various information processing tasks or control tasks of peripheral devices, a random access memory (RAM) functioning as a work area of the CPU, a random only memory (ROM) that stores a control program or data executed by the CPU, and a network interface that performs a communication process via a network. The CPU executes a predetermined control program (for example, an image collation program), and thus, various functions (for example, a collating process of an image) of face collation apparatus 3 to be described below may be realized. Face collation apparatus 3 is not limited to a computer device, and may be another information processing apparatus (such as a server) capable of achieving the same functions. At least some of the functions of face collation apparatus 3 may be replaced by performing processing using another known hardware.

As shown in FIG. 1, face collation apparatus 3 includes image acquirer 11, registered-person image storage 12, image collator 13, unregistered-person image storage 14, image group creator 15, image output unit 16, and image register 17. The respective units are controlled by a not-shown controller.

Image acquirer 11 is connected to capturing device 2, and acquires the face image (captured image) of the collated person from capturing device 2. Image acquirer 11 is connected to image collator 13, and the captured image acquired by image acquirer 11 from capturing device 2 is input to image collator 13.

Registered-person image storage 12 stores the face image (registered-person image) of the previously registered person. One registered-person image is a face image of one certain person. Registered-person image storage 12 generally stores a plurality of registered-person images. Registered-person image storage 12 may stores one registered-person image of each of a plurality of persons, or may store a plurality of registered-person images of each of a plurality of persons. The registered-person image is assigned a registered-person name as a name for identifying a subject. The user may assign the registered-person name, or registered-person image storage 12 may automatically assign according to a predetermined method.

Image collator 13 is connected to image acquirer 11, registered-person image storage 12, and unregistered-person image storage 14. Image collator 13 collates the captured image input from image acquirer 11 with the registered-person image stored in registered-person image storage 12. Specifically, the image collator calculates similarity between the captured image and the registered-person image by using a model acquired through previously performed machine learning, determines that the captured image matches the registered-person image in a case where the calculated similarity exceeds a predetermined threshold, and determines that the captured image does not match the registered-person image in a case where the captured image is equal to or less than the threshold. The above-described machine learning is performed using data which is called collation data and includes the number of features used for collating the face images. The face image collation technique used by image collator 13 is not particularly limited, and various other known face image collation techniques may be used.

The collation result (that is, verification result) of image collator 13 is output to the outside of face collation apparatus 3 such as a security system or a monitoring camera system through a not-shown output unit. The captured image that does not match the registered-person image in the collation of image collator 13 is input to unregistered-person image storage 14. The captured image that matches the registered-person image in the collation of image collator 13 may be input to registered-person image storage 12, and may be registered as the face image of the person previously registered in registered-person image storage 12. As stated above, if the captured image that matches the registered-person image is registered as the face image of the previously registered person, since it is possible to increase the number of face images of the previously registered person, it is possible to improve collation precision in the subsequent collation processes.

Unregistered-person image storage 14 stores the captured image which is input from image collator 13 and does not match the registered-person image. In the present disclosure, it is assumed that the captured image stored in unregistered-person image storage 14 is referred to as the "unregistered-person image". Even though the person of the captured image is the same as the person previously registered in registered-person image storage 12, the captured image may not match the registered-person image in the collation due to a facial direction of the collated person, a light direction, or an illumination environment. Accordingly, there is a possibility that the face image of the person previously registered in registered-person image storage 12 will be included in the unregistered-person image.

Image group creator 15 is connected to unregistered-person image storage 14. The image group creator groups the unregistered-person images stored in unregistered-person image storage 14 based on similarities between the unregistered-person images, and creates unregistered-person image groups. Specifically, similarities between all the unregistered-person images stored in unregistered-person image storage 14 are calculated. The similarity may be calculated as the sum or sum of squares of absolute values of differences between pixel values of corresponding pixels between two images. Alternatively, after the unregistered-person image is projected onto a feature space used in the collation, the similarity may be calculated as the sum or sum of squares of absolute values of differences between projective vectors. The unregistered-person images of which the similarities exceed the predetermined threshold are grouped, and the unregistered-person image groups are created. The grouping technique used by image group creator 15 is not particularly limited, and various other known grouping techniques may be used.

Image output unit 16 is connected to unregistered-person image storage 14 and display device 4, and outputs the unregistered-person image stored in unregistered-person image storage 14 for each unregistered-person image group to display device 4. Accordingly the unregistered-person image group is displayed for each group on a screen of display device 4. For example, the same group is displayed on the same screen of display device 4. The unregistered-person image groups may be displayed on display device 4 in descending order of the number of unregistered-person images. Since the unregistered-person image group of which the number of unregistered-person images is large is a group including a captured image having a high possibility that the collation will fail or a captured image of a person who appears with high frequency, the unregistered-person image group of which the number of unregistered-person images is large is registered in registered-person image storage 12, and thus, it is possible to improve collation precision in the subsequent collation processes.

Image output unit 16 may display only the unregistered-person image group of which the number of unregistered-person images exceeds a predetermined number on display device 4. That is, the unregistered-person image group of which the number of unregistered-person images is equal to or less than the predetermined number may not be output to display device 4. By doing this, since it is necessary to register the unregistered-person images in the registered-person image group of which the number of unregistered-person images is equal to or less than the predetermined number, it is possible to efficiently register the unregistered-person image.

The method of outputting the unregistered-person image to display device 4, that is, the method of displaying the unregistered-person image on display device 4 is not limited thereto. For example, the unregistered-person image may be output for not each unregistered-person image group but one or a plurality of unregistered-person images which is not grouped on display device 4.

Image register 17 is connected to input device 5, and receives a command of the user from input device 5. The command of the user is a command which includes a command to select the unregistered-person image to be registered and a command to register the selected unregistered-person image, and relates to the registration of the unregistered-person image. The details thereof will be described with reference to FIGS. 5 to 9. Image register 17 is connected to unregistered-person image storage 14 and registered-person image storage 12, and registers the unregistered-person image selected so as to be registered by the user among the unregistered-person images output to display device 4 in registered-person image storage 12. The unregistered-person image selected so as to be registered by the user may be registered as the face image of the previously registered person in registered-person image storage 12, or may be registered as a face image of a newly registered person.

Figure 2:
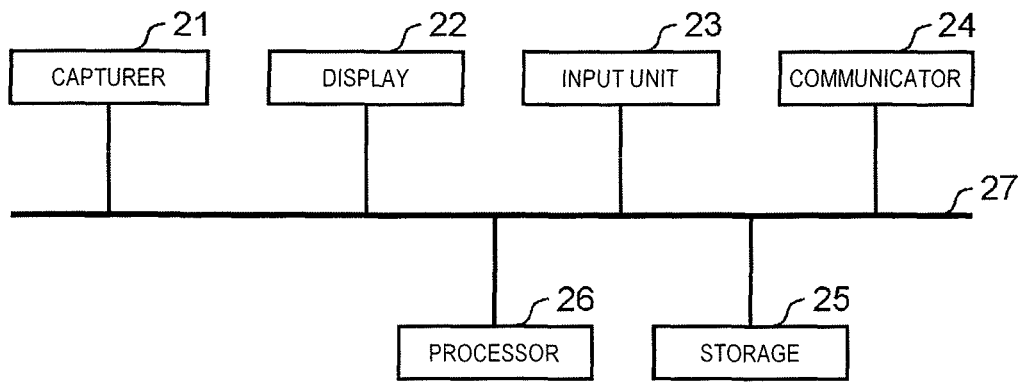
FIG. 2 is a block diagram showing a hardware configuration for realizing the face collation apparatus system of the present disclosure.

FIG. 2 is a block diagram showing a hardware configuration for realizing face collation system 1 of FIG. 1. As shown in FIG. 2, face collation system 1 of FIG. 1 is realized by a hardware configuration including capturer 21, display 22, input unit 23, communicator 24, storage 25, processor 26, and system bus 27 that connects these units.

Capturer 21 is, for example, a CCD camera, and is used for capturing the face image of the collated person. Capturer 21 corresponds to capturing device 2 of FIG. 1.

Display 22 is a general display device, and is used for displaying the unregistered-person image output from face collation apparatus 3. Display 22 corresponds to display device 4 of FIG. 1.

Input unit 23 is a general input device such as a keyboard or a mouse, and is used for allowing the user to input the command to face collation apparatus 3. Input unit 23 corresponds to input device 5 of FIG. 1.

Communicator 24 is a general communication module, and is used for causing face collation apparatus 3 to communicate with another device or system on the outside. For example, communicator 24 is used for outputting the collation result of image collator 13 to display 22 or a security system or an monitoring camera system on the outside.

Storage 25 is, for example, a ROM or a hard disk, and stores various programs and various data items for realizing various functions of face collation apparatus 3. The various programs are programs for realizing the respective processes of image acquirer 11, registered-person image storage 12, image collator 13, unregistered-person image storage 14, image group creator 15, image output unit 16, and image register 17 of face collation apparatus 3, a program for controlling entire face collation apparatus 3, and programs for controlling capturing device 2, display device 4, and input device 5 connected to face collation apparatus 3. The various data items are the registered-person images stored in registered-person image storage 12, the unregistered-person images and the unregistered-person image groups stored in unregistered-person image storage 14, the thresholds used in the respective processes of the respective units of face collation apparatus 3, and collation data items used in the collation of the face images of image collator 13.

Processor 26 is, for example, a CPU, and performs the respective processes of image acquirer 11, image collator 13, image group creator 15, image output unit 16, and image register 17 of face collation apparatus 3 by reading the various programs and the various data items into a not-shown RAM from storage 25. Processor 26 generally performs a control task of entire face collation apparatus 3 and control tasks of peripheral devices (capturing device 2, display device 4, and input device 5) of face collation apparatus 3.

Figure 3:
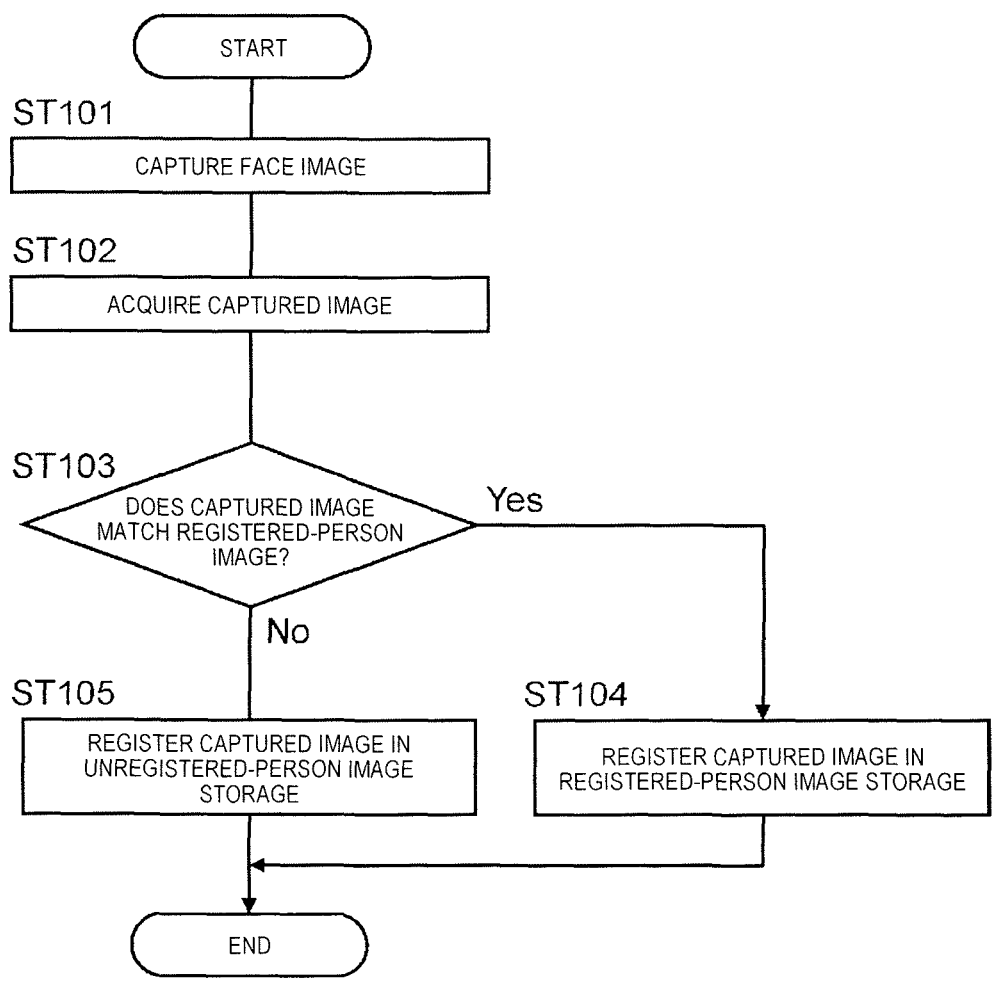
FIG. 3 is a flowchart showing a flow of a process of registering an unregistered-person image in an unregistered-person image storage.
Figure 4:
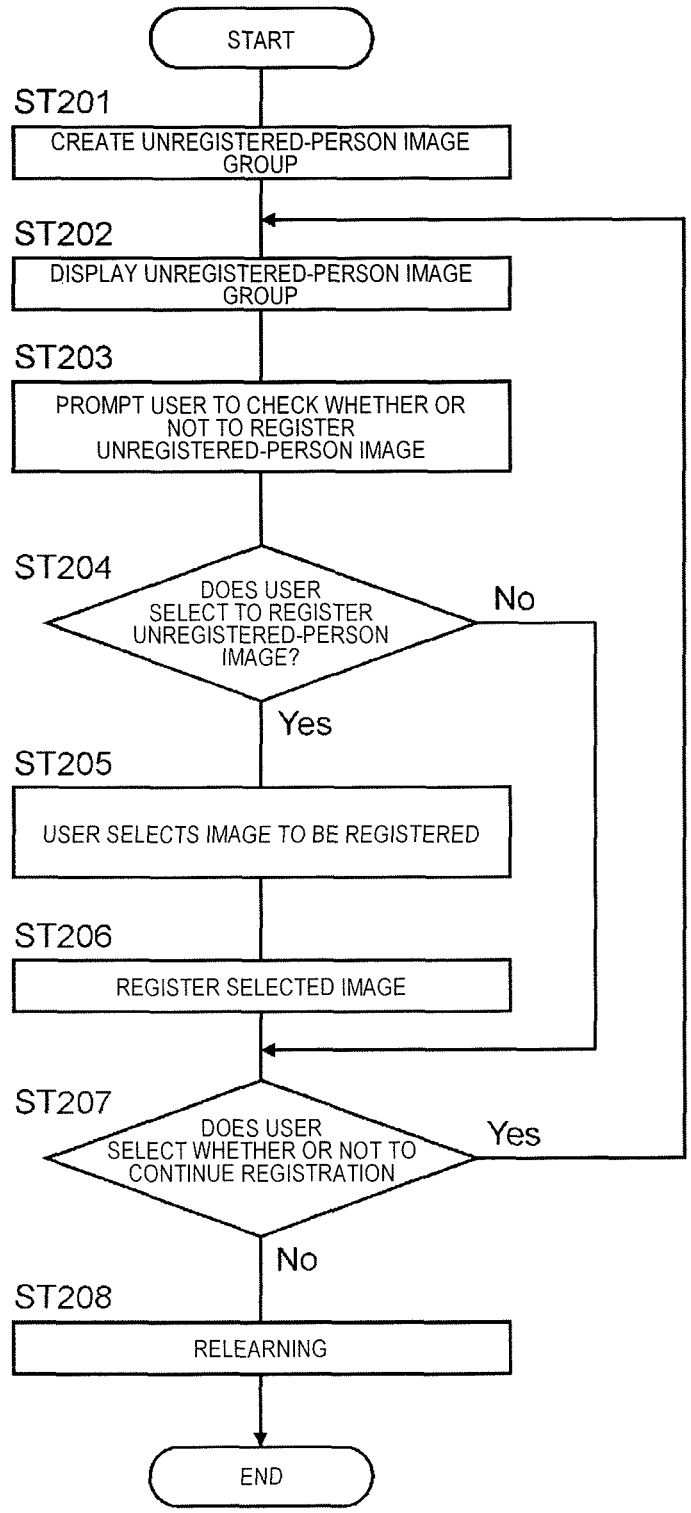
FIG. 4 is a flowchart showing a flow of a process of registering the unregistered-person image in a registered-person image storage.

Hereinafter, a flow of a face image collation process performed by face collation system 1 shown in FIG. 1 will be described with reference to FIGS. 3 and 4. FIG. 3 is a flowchart showing a flow of a process of registering the unregistered-person image in unregistered-person image storage 14, and FIG. 4 is a flowchart showing a flow of a process of registering the unregistered-person image in registered-person image storage 12.

The flow of the process of registering the unregistered-person image in unregistered-person image storage 14 will be described with reference to FIG. 3. Initially, capturing device 2 captures the face image of the collated person (step ST101). Subsequently, image acquirer 11 of face collation apparatus 3 acquires the face image (captured image) of the collated person from capturing device 2 (step ST102). Subsequently, image collator 13 of face collation apparatus 3 collates the captured image with the registered-person image stored in registered-person image storage 12, and determines whether or not these images match each other (step ST103). The process proceeds to step ST104 in a case where it is determined that these images match each other (ST103: Yes), and the process proceeds to step ST105 in a case where it is determined that these images do not match each other (ST103: No). The captured image is registered in registered-person image storage 12 in step ST104, and the captured image is registered in unregistered-person image storage 14 in step ST105. By doing this, the captured image that does not match the registered-person image in the collation of image collator 13 is registered as the unregistered-person image in unregistered-person image storage 14.

The flow of the process of registering the unregistered-person image in registered-person image storage 12 will be described with reference to FIG. 4. Initially, image group creator 15 of face collation apparatus 3 groups the unregistered-person images stored in unregistered-person image storage 14 based on the similarities between the unregistered-person images, and creates the unregistered-person image groups (step ST201). Subsequently, the unregistered-person image group is displayed for each group on display device 4 (step ST202). In this case, the unregistered-person image groups may be output in descending order of the number of unregistered-person images.

Figure 5:
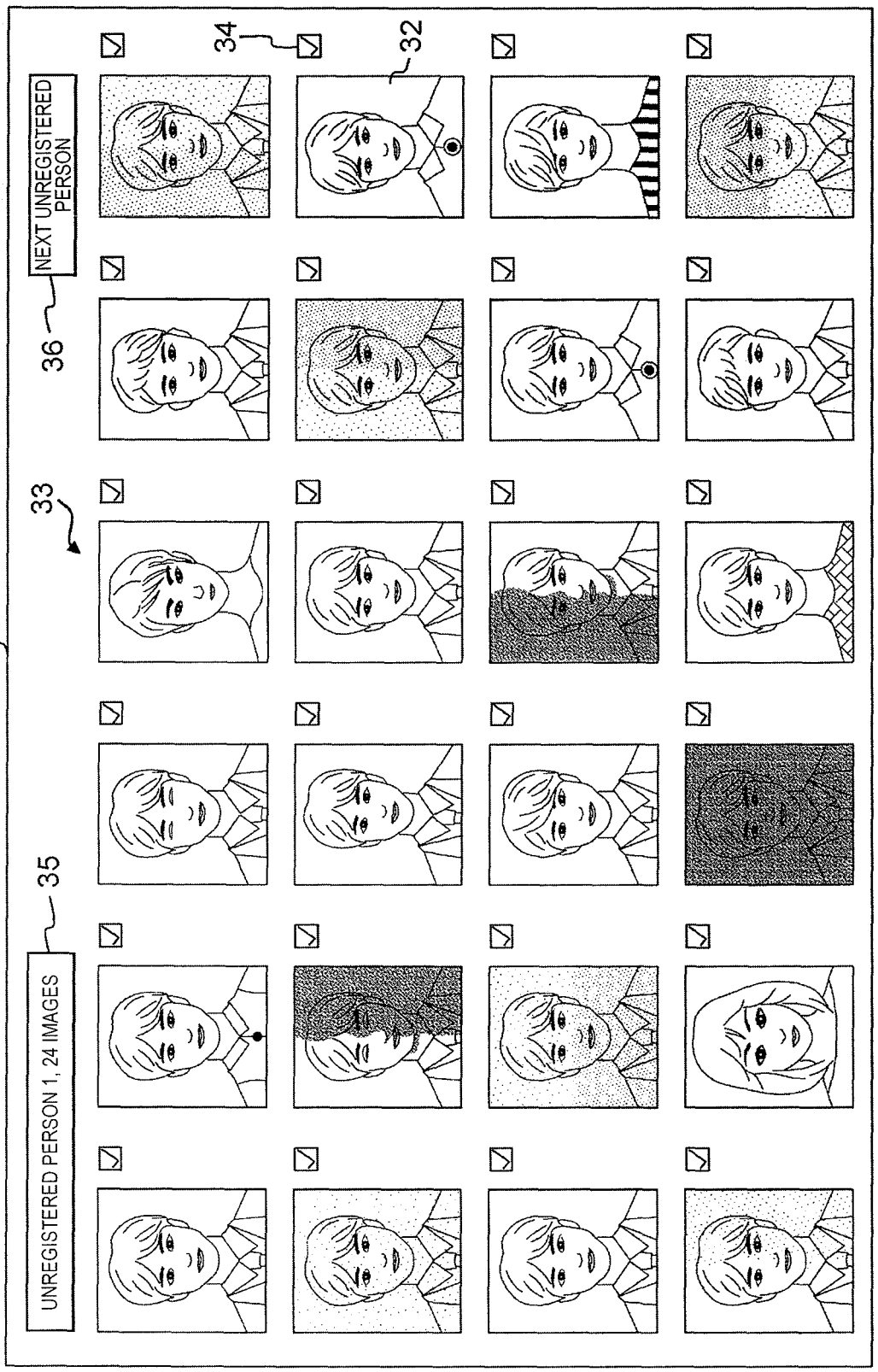
FIG. 5 is a diagram showing an example of a screen of an unregistered-person image group displayed on a display device.

FIG. 5 is a diagram showing an example of screen (hereinafter, simply referred to as a "display screen") 31 of the unregistered-person image group displayed on display device 4. Unregistered-person image group 33 including 24 unregistered-person images 32 is displayed on display screen 31 shown in FIG. 5. Check box 34 for allowing the user to select unregistered-person image 32 to be registered in registered-person image storage 12 is provided on the right side of each unregistered-person image 32. In the example of FIG. 5, check boxes 34 of all unregistered-person images 32 are previously checked, and unregistered-person images 32 that will not be registered in registered-person image storage 12 are selected by unchecking the check boxes.

Display box 35 for displaying a name of unregistered-person image group 33 and the number of unregistered-person images 32 included in unregistered-person image group 33 is provided on the upper left side of display screen 31. In the example of FIG. 5, the name of unregistered-person image group 33 is "Unregistered Person 1", and the number of unregistered-person images 32 is "24". Button 36 for switching display screen 31 in order to display the next unregistered-person image group is provided on the upper right side of display screen 31.

Figure 6:
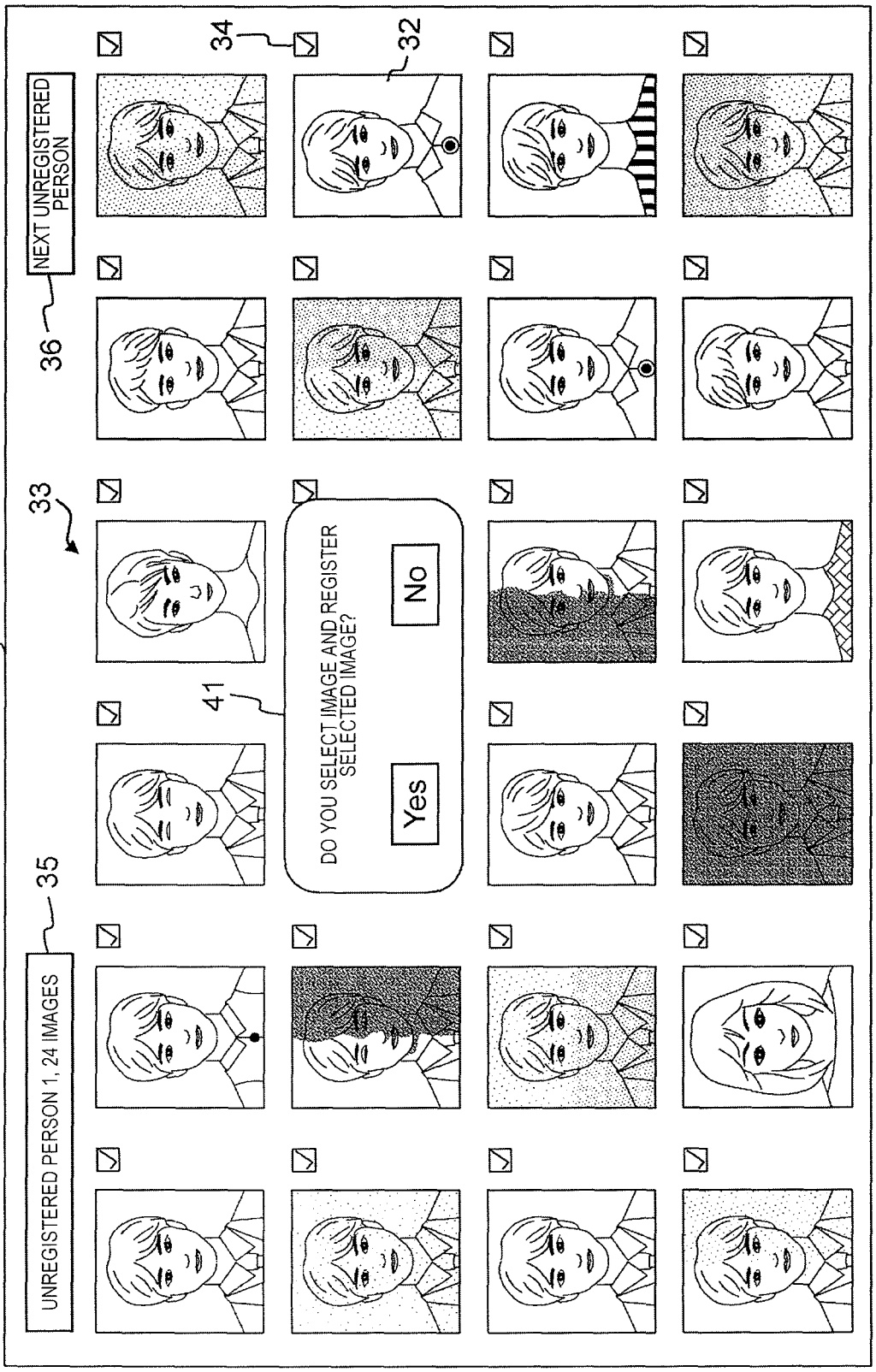
FIG. 6 is a diagram showing a state in which a message box for allowing a user to select the unregistered-person image and to register the selected unregistered-person image is displayed on a display screen.

In subsequent step ST203, the face collation system prompts the user to check whether or not to perform a registration operation of registering unregistered-person image 32 in registered-person image storage 12. Specifically, as shown in FIG. 6, the face collation system displays message box 41 of "do you select image and register selected image?" on display screen 31, and prompts the user to check. In subsequent step ST204, the user selects whether or not to perform the registration operation. The user selects any one of "Yes" and "No" of message box 41 by operating input device 5, and may select whether or not to perform the registration operation. The process proceeds to step ST205 in a case where the user selects to perform the registration operation (ST204: Yes), and the process proceeds to step ST207 to be described below in a case where the user selects not to perform the registration operation (ST204: No).

Figure 7:
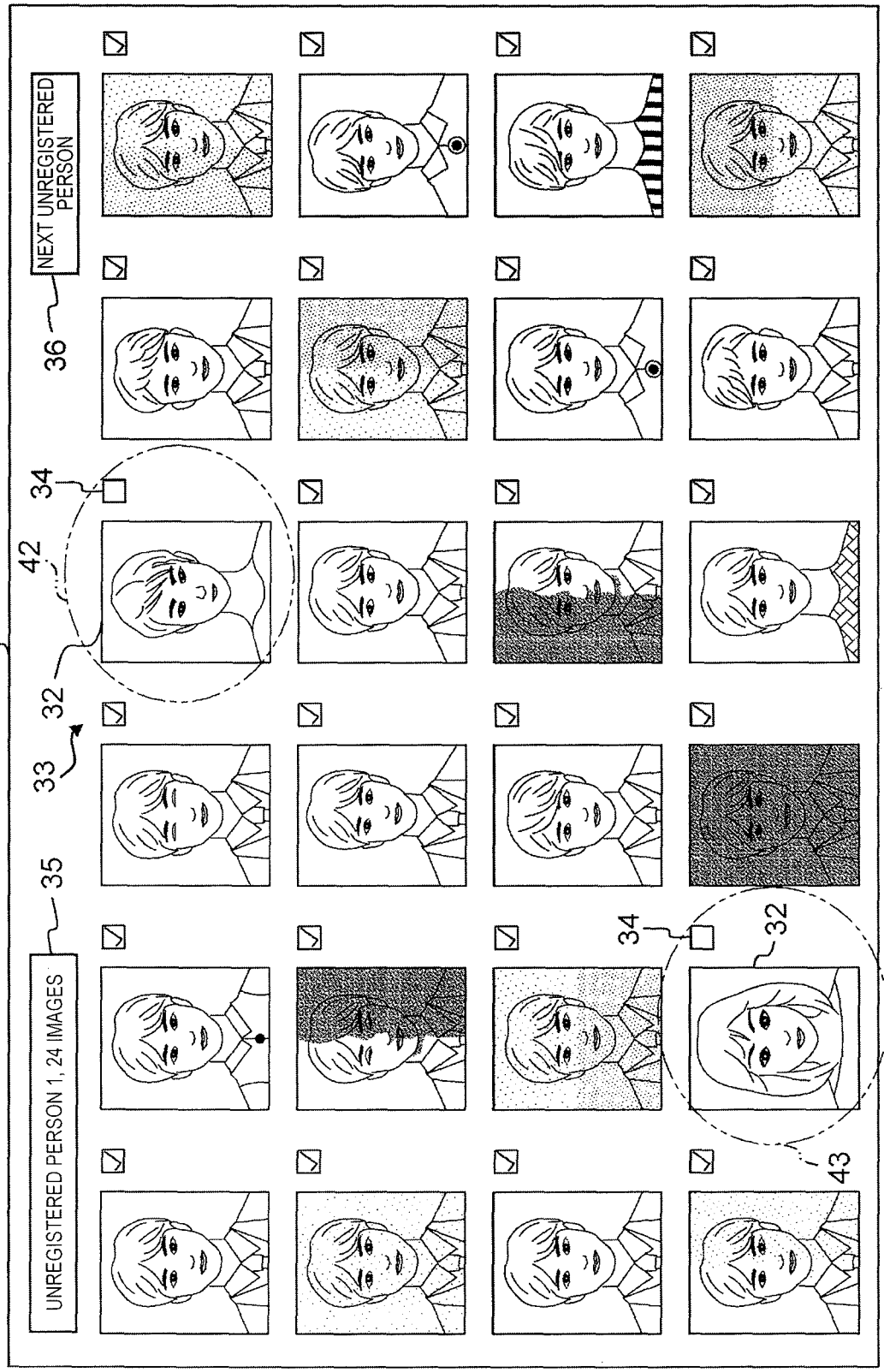
FIG. 7 is a diagram showing a state in which a check box of the display screen is unchecked.

Subsequently, in step ST205, unregistered-person image 32 to be registered in registered-person image storage 12 is selected by the user. A face image of a person different from a person to be registered may be included in unregistered-person image group 33. Thus, when unregistered-person image 32 is registered in registered-person image storage 12, it is necessary to select unregistered-person image 32 not to be registered and to exclude the unregistered-person image. Specifically, as shown in FIG. 7, check box 34 of unregistered-person image 32 is unchecked, and thus, unregistered-person image 32 not to be registered may be selected and excluded. On display screen 31 shown in FIG. 7, check boxes 34 of third unregistered-person image 32 from the right in an upmost column surrounded by circle 42 depicted by a dashed double-dotted line and second unregistered-person image 32 from the left in a lowermost column surrounded by circle 43 depicted by a dashed double-dotted line are unchecked, and two unregistered-person images 32 are excluded from the registration.

Figure 8:
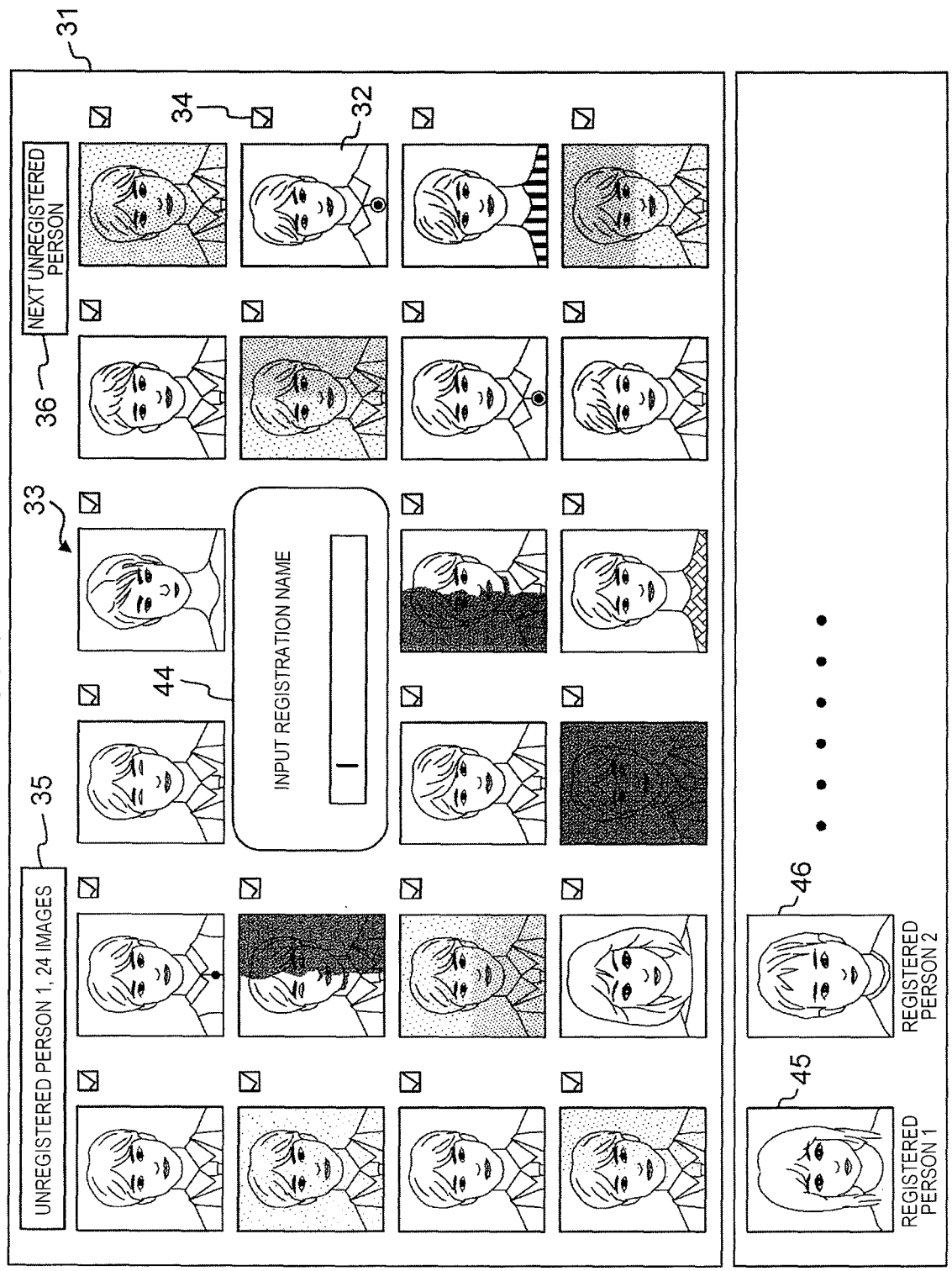
FIG. 8 is a diagram showing a state in which an input box for inputting a registration name is displayed on the display screen.

In subsequent step ST206, unregistered-person image 32 selected in step ST205 is assigned a name, and is registered in registered-person image storage 12. Specifically, as shown in FIG. 8, input box 44 for inputting a registration name is displayed on display screen 31. A registration name and a representative image of the registered-person image group previously registered in registered-person image storage 12 are displayed under display screen 31. In the example of FIG. 8, two registered-person images 45 and 46 are displayed. A registration name of registered-person image 45 is "Registered Person 1", and a registration name of registered-person image 46 is "Registered Person 2". The user inputs the registration name to input box 44 by operating input device 5. If the user inputs the registration name of the registered-person image previously registered in registered-person image storage 12, unregistered-person image 32 is registered as the face image of the registered person having the registration name. If the user inputs a new registration name, unregistered-person image 32 is registered as a face image of a new registered person.

Before input box 44 of FIG. 8 is displayed, message box 47 of "do you register an unregistered-person image?" may be displayed on display screen 31 as shown in FIG. 9, and the user may be prompted to check whether or not to register the unregistered-person image. In this case, the user selects any one of "OK" and "CANCEL" of message box 47 by operating input device 5, and thus, may select whether or not to register the unregistered-person image.

In subsequent step ST207, the user selects whether or not to continue the registration operation on the next unregistered-person image group. For example, after step ST206 is ended, a message box for allowing the user to check whether or not to continue the registration process. Alternatively, after step ST206 is ended, the screen may automatically transition to the display screen of the next unregistered-person image group, and may allow the user to select whether or not to continue the registration operation on this display screen. The process returns to step ST202 in a case where the user selects to continue the registration operation (ST207: Yes), and the processes subsequent to step ST202 are repeated. The process proceeds to step ST208 in a case where the user selects to end the registration operation (ST207: No).

In step ST208, image collator 13 performs relearning of collation data by using the unregistered-person image registered in registered-person image storage 12. The unregistered-person image registered in registered-person image storage 12 is an image that the fact that the image is associated with a specific registered person is checked by the user. Accordingly, the relearning is performed using such an image, and thus, accuracy of the collation data is improved. Thereafter, the process is ended.

By doing this, the unregistered-person image selected to be registered by the user among the unregistered-person images registered in unregistered-person image storage 14 may be registered as the registered-person image in registered-person image storage 12. The unregistered-person image may be registered as the face image of the registered person previously registered in registered-person image storage 12, or may be registered as a face image of a new registered person. Image collator 13 performs the relearning of the collation data is performed using the unregistered-person image registered in registered-person image storage 12, and thus, it is possible to improve collation precision in the subsequent collation processes.

Although the present disclosure has been described based on the specific exemplary embodiment, these exemplary embodiment is merely an example, and the present disclosure is not limited to the exemplary embodiment. All the respective constituent elements of the face collation apparatus, the face collation system including the same, and the face collation method according to the above-described exemplary embodiment are not necessarily essential, and may be appropriately selected without departing from at least the scope of the present disclosure.

INDUSTRIAL APPLICABILITY

The face collation apparatus, the face collation system including the same, and the face collation method according to the present disclosure are useful as a face collation apparatus, a face collation system including the same, and a face collation method capable of improving collation precision in the subsequent collation processes or creating a database of collation images by registering at least a part of the captured images that does not match the previously registered face image, as a collation face image.

REFERENCE MARKS IN THE DRAWINGS 1 face collation system
2 capturing device
3 face collation apparatus
4 display device
5 input device
11 image acquirer
12 registered-person image storage
13 image collator
14 unregistered-person image storage
15 image group creator
16 image output unit
17 image register

The invention claimed is:

1. A face collation apparatus configured to:
acquire face images of the collated persons captured by capturing device;
store the face images of previously registered persons;
collate the face images of the collated persons with the face images of the previously registered persons;
store the face images of the collated persons that do not match the face images of the previously registered persons, as unregistered-person images;
output at least one of the unregistered-person images; and
register the unregistered-person image as a face image of the previously registered person, when the unregistered-person image is selected to be registered by a user, among the unregistered-person images output to a display device.

2. The face collation apparatus of claim 1,
wherein the face collation apparatus is configured to register the selected unregistered-person image as a face image of a newly registered person.

3. The face collation apparatus of claim 1,
wherein the face collation apparatus is configured to group the stored unregistered-person images based on similarities between the unregistered-person images and create unregistered-person image groups, and
output the unregistered-person images for each unregistered-person image group to the display device.

4. The face collation apparatus of claim 3,
wherein the face collation apparatus is configured to output the unregistered-person image groups in descending order of the number of unregistered-person images.

5. The face collation apparatus of claim 3,
wherein the face collation apparatus is configured to output only the unregistered-person image group of which the number of unregistered-person images exceeds a predetermined number to the display device.

6. The face collation apparatus of claim 1,
wherein the face collation apparatus is configured to perform relearning of collation data by using the unregistered-person images registered in the registered-person image storage.

7. A face collation system comprising:
the face collation apparatus of claim 1;
a capturing device that captures face images of collated persons;
a display device that displays the unregistered-person images output from the face collation apparatus; and
an input device that allows a user to input a command regarding registration of the unregistered-person images to the face collation apparatus.

8. The face collation system of claim 7,
wherein the face collation apparatus is configured to register the unregistered-person image, which is selected to be registered by the user among the unregistered-person images output to the display device, as a face image of a person previously registered in the registered-person image storage, or register the selected unregistered-person image as a face image of a newly registered person.

9. The face collation system of claim 7,
wherein the face collation apparatus is configured to group the unregistered-person images stored in the unregistered-person image storage based on similarities between the unregistered-person images and create unregistered-person image groups, and
output the unregistered-person images for each unregistered-person image group to the display device.

10. The face collation system of claim 9,
wherein the face collation apparatus is configured to output the unregistered-person image groups in descending order of the number of unregistered-person images.

11. The face collation system of claim 9,
wherein the face collation apparatus is configured to output only the unregistered-person image group of which the number of unregistered-person images exceeds a predetermined number to the display device.

12. The face collation system of claim 7,
wherein the face collation apparatus is configured to perform relearning of collation data by using the unregistered-person images.

13. A face collation method comprising:
acquiring face images of the collated persons captured by a capturing device;
storing the face images of previously registered persons;
collating the face images of the collated persons with the face images of the previously registered persons;
storing the face images of the collated persons that do not match the face images of the previously registered persons, as unregistered-person images;
outputting at least one of the unregistered-person images; and
registering the unregistered-person image as a face image of the previously registered person, when the unregistered-person image is selected to be registered by a user, among the unregistered-person images output to a display device.

14. The face collation method of claim 13, further comprising:
registering the selected unregistered-person image as a face image of a newly registered person.

15. The face collation method of claim 13, further comprising:
grouping the unregistered-person images based on similarities between the unregistered-person images and creating unregistered-person image groups; and
outputting the unregistered-person images for each unregistered-person image group to the display device.

16. The face collation method of claim 15, further comprising:
outputting the unregistered-person image groups in descending order of the number of unregistered-person images to the display device.

17. The face collation method of claim 15, further comprising:
outputting only the unregistered-person image group of which the number of unregistered-person images exceeds a predetermined number to the display device.

18. The face collation method of claim 13, further comprising:
performing relearning of collation data by using the unregistered-person images.

* * * * *